Nov. 1, 1960 G. E. OGELVIE 2,958,353
CORING AND SLICING MACHINE
Filed March 14, 1958 4 Sheets-Sheet 1

INVENTOR
GUY E. OGELVIE
BY
Gardner & Zimmerman
ATTORNEYS

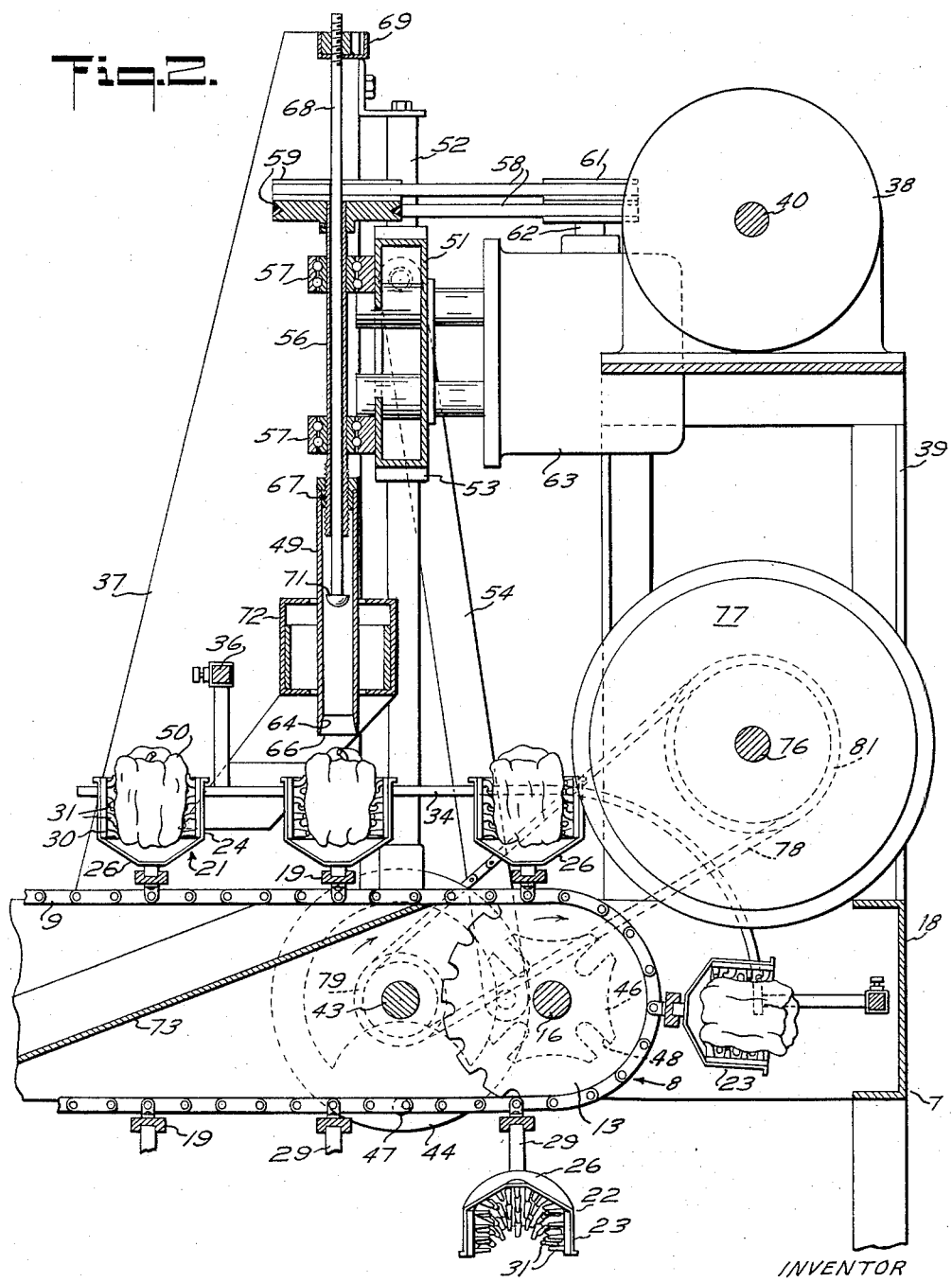

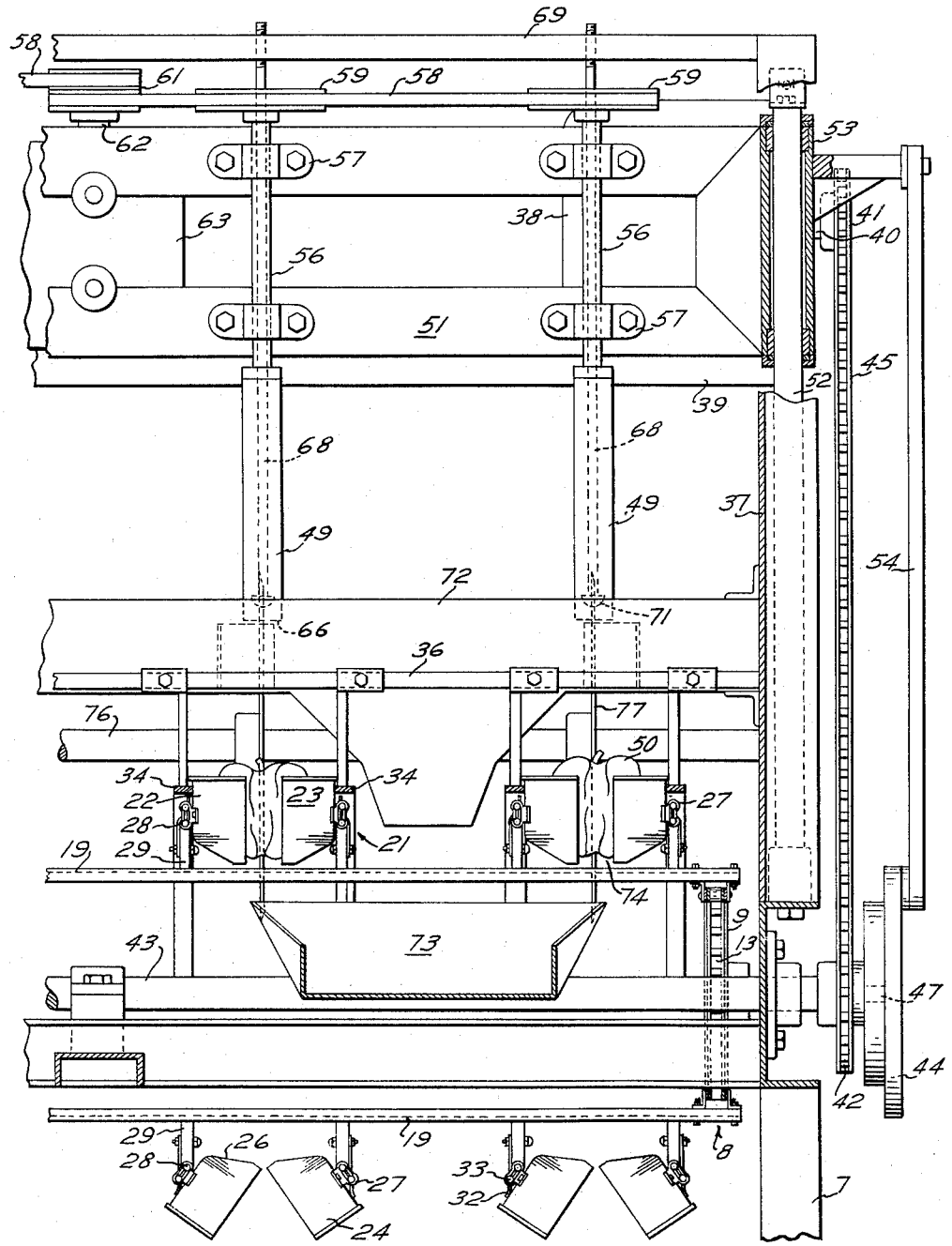

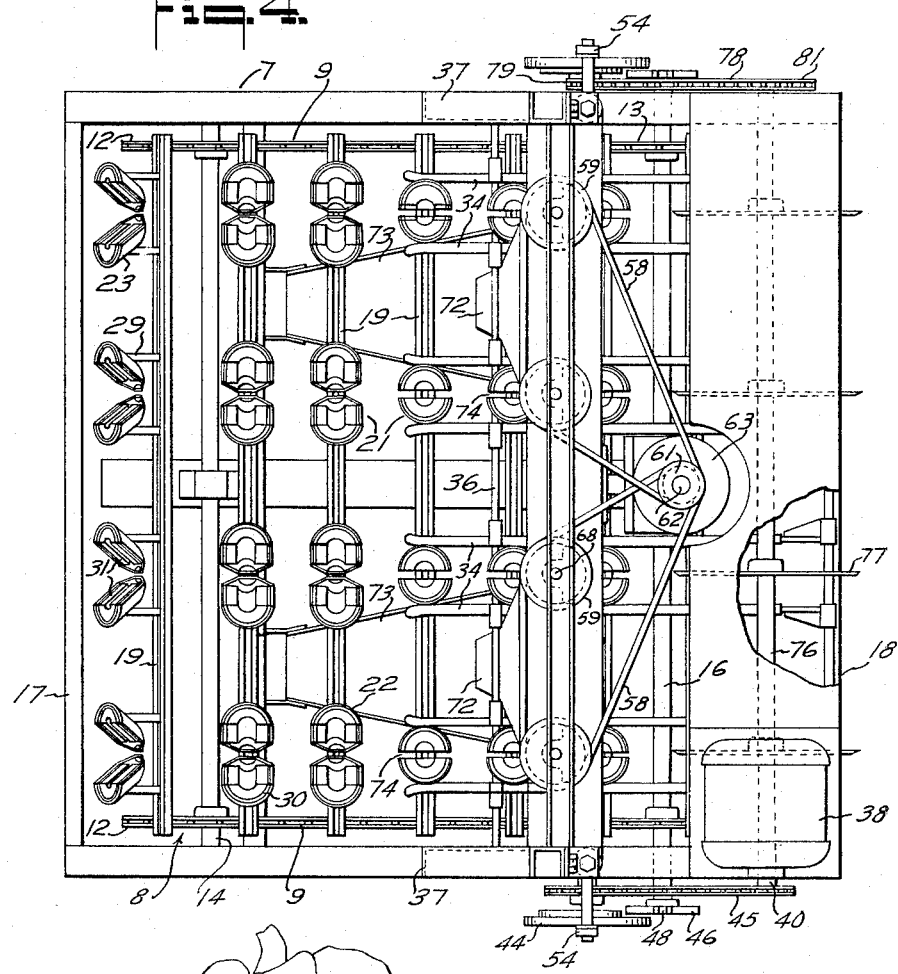

United States Patent Office 2,958,353
Patented Nov. 1, 1960

2,958,353

CORING AND SLICING MACHINE

Guy E. Ogelvie, Hayward, Calif. (% Diamond Manufacturing Co., 1625 Willow, Oakland, Calif.)

Filed Mar. 14, 1958, Ser. No. 721,393

3 Claims. (Cl. 146—52)

This invention relates to a machine for coring and slicing certain vegetables and fruit such as bell peppers, pimientos, tomatoes, apples, etc., and more particularly to a machine in which the various operations are performed automatically.

Heretofore considerable difficulty has been encountered in successfully designing a machine to automatically core and slice certain kinds of vegetables and fruits as, for example, bell peppers, pimientos, tomatoes, papayos, etc. This is due to the fact that these products usually lack firmness, their exterior surfaces are delicate, and their size and form ordinarily varies considerably.

In view of the foregoing it is an object of the present invention to provide a machine which will effectively support the product, regardless of substantial differences in sizes and shapes, and effect the coring and slicing operations without damage to the surface of the product or other injury to the product beyond the desired coring and slicing of the product.

Another object of the invention is to provide a means of supporting the product for the coring and slicing operations which will be suitable for manual insertion of the product therein and will center the product automatically so that accurate placement of the product in the support by the operator will not be required.

A further object of the invention is to provide means which will serve to effectively support the product during the coring and slicing operations, but which is operative prior to such operations, to afford ready insertion of the product into the supporting means, and on completion of such operations is operative to facilitate discharge of the product from the supporting means.

A still further object of the invention is to provide especially effective means for severing the core in the product and for removing the core as a unit from the product.

Yet another object of the invention is to provide a machine of the character described in which the coring and slicing operations are effected in such manner that a relatively large capacity operation may be provided for with a machine of comparatively small size and simple design.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 3 is a fragmentary front view of the machine as shown in Figure 2.

Figure 4 is an enlarged top plan view of the machine as shown in Figure 1.

Figure 5 is an enlarged longitudinal section view of one of the cup-like product receiving and holding members showing it in opened position.

Figure 6 is a view corresponding to Figure 5, but showing the holding member in closed position.

Figure 1:
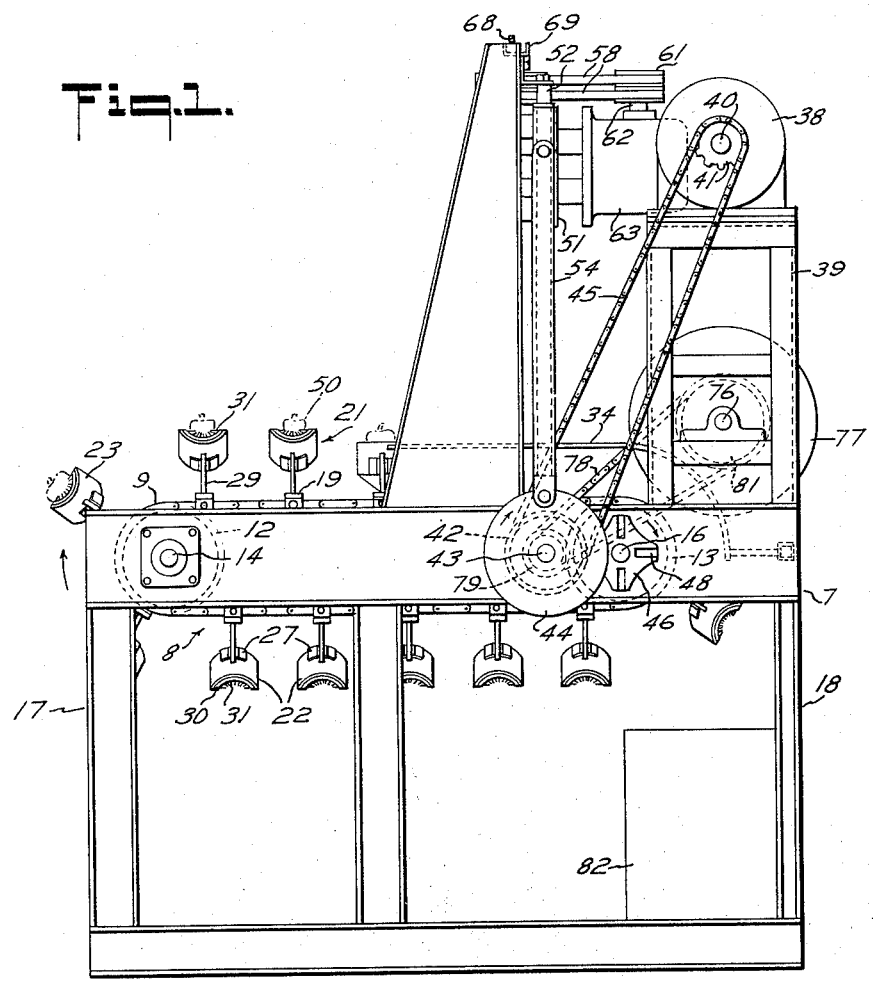
Figure 1 is an end view of a machine embodying the features of the present invention.

As shown in the drawings, the machine comprises a frame 7 in which is supported a horizontally extending conveyor unit 8 which includes a pair of transversely spaced chains 9 carried on sprocket gears 13 and 13, the gears being mounted on shafts 14 and 16 adjacent the front 17 and rear 18 respectively of the frame 7. As will be seen, a separate set of the sprocket gears 12 and 13 is provided for each chain, and as will be clear from Figures 3 and 4, the chains are connected together by bars 19.

The conveyor unit 8 provides a means of moving the products to be operated upon, to various stations where the operations on the products are effected, and means are provided on such unit for receiving and supporting the products individually for and during such operations. The means for receiving and supporting the products forms a very important part of the present invention, and as shown in detail in Figures 5 and 6 comprise a plurality of cup-like holders 21 each formed of a pair of segments 22. The segments of each holder are arranged for movement to and from each other so as to assume either an open or closed position. In the open position, the segments are disposed in spaced relation so as to facilitate introduction of the product therein or ejection of the product therefrom. In the closed position the segments serve to retain the product for and during the coring and slicing operations.

The holders are mounted on the bars 19, and where as here the machine is designed for feeding by hand, the spacing between the holders lengthwise along the conveyor is such that at a given rate of speed of the conveyor the operator may readily and rapidly insert one of the products in each of the holders as the latter are in open position for the reception thereof. As shown in the enlarged views of Figures 5 and 6, the holder segments are pivotally mounted on the bars, and each is provided with a backing plate 23 having semi-cylindrical side walls 24 and a sloping bottom wall 26, the edges of the side and bottom walls being in the same plane. The segments are mounted in such manner that each pair thereof will be disposed with the concave faces in confronting relation and slightly spaced from each other. Pivotal mounting of the segments is afforded by means of ears 27 provided on the outer face of the walls 24 and connected by pins 28 to posts 29 extending perpendicularly from the bar on which the segments are positioned. It will be noted that the pivotal axis of the segments is located medially between the side edges of the walls and also intermediate the rim and bottom wall of the backing plate 23. By reason of the foregoing and since the opposing segments are in spaced relation, if the segments are tilted outwardly about their pivotal axes as shown in Figure 5, the bottom or base portions will be moved toward each other while the outer or rim portions will be moved away from each other so as to thereby facilitate the introduction of the product to the cavity between the segments.

Provided on the side walls of the backing plate 23 and extending radially inward therefrom are a plurality of resilient fingers 31. Preferably the fingers are formed integral with a liner 30 affixed to the plate. The fingers taper inwardly toward their free ends and are relatively thin so that individually they are extremely flexible and offer little resistance to flexure particularly at their free end portions. In order to provide for a maximum number of fingers in the space between the pair of plates, the fingers are arranged in rows separated axially in said space and with the fingers in alterante rows in staggered relation. The fingers are foreshortened at their free ends so as to define an open central space through the axial center of the holder. As will be understood the free end portions of the fingers are designed to engage the product and hold it with a resilient pressure sufficient for supporting it for the coring and slicing operations without bruising the surface of the product or causing any harmful deformation thereof.

As will be evident from Figure 5, when the holder is in open position, the bottom portion of the opposing segments are extended inward so that in this position the fingers nearer the bottom form a resilient stop to limit the inward positioning of the product in the holder. On the other hand when the segments are moved to the closed position shown in Figure 6, the fingers near the open end of the holder are moved inward while the fingers nearer the bottom are retracted. In this manner, when a product has been inserted in the holder, the various fingers will engage the product with a substantially uniform pressure, and also there will be no danger of the fingers near the bottom exerting a crushing force on the product. It may be added that the fingers are flexible to the degree that not only the free end portions but the entire body of the fingers may be flexed, thus the cushioning effect is distributed throughout the entire mass of the fingers.

In the present embodiment of the invention the segments are normally held in open position by means of springs 32 which are mounted on and secured to the posts 29 and engage pins 33 conveniently provided on the ears 27. For moving the segments to closed position there is provided a pair of guides 34 which are positioned over the conveyor unit and arranged to engage the outer sides of the segments as the latter are being moved along the conveyor. The guides are adjustably mounted on a cross-piece 36 extending between brackets 37 provided on the frame 7, and likewise the posts are secured for transverse adjustment on the bars 19. This adjustment of the guides and posts permits use of the same holders for accommodating the apparatus for products of different size and to also regulate the amount of opening or closing of the segments. In order to increase the capacity of the machine, a number of sets of the holders may be mounted on each of the bars 19, the various holders on the bar being spaced uniformly thereon and aligned with the holders on the other bars.

Movement is imparted to the conveyor 8 by an electric motor 38 supported on a rear bracket 39, driving connection between the motor and rear shaft 16 of the conveyor being afforded by a chain 45 engaging sprockets 41 and 42 mounted on the motor and intermediate shafts 40 and 43 respectively, the shaft 43 being arranged to effect intermittent rotation of shaft 16 through the medium of cooperating wheels 44 and 46 of a Geneva motion system mounted on the shafts 43 and 16 respectively. As will be understood, the wheel 44 is provided with a pin 47 which successively engages in slots 48 in wheel 46, the latter being caused to rotate when the pin is engaged in a slot, but held stationary when the pin is disengaged and being moved from one slot to another. For each revolution of wheel 44, wheel 46 will advanve the conveyor to the extent of moving one set of holders out of registration with the knives, and the succeeding set into registration therewith.

The front end of the conveyor is disposed at the immediate front of the machine, and the conveyor is driven with the upper reach moving from the front to the rear. In this manner the holders will be on the ascent at the front of the machine, and since they are arranged to be held in open position during and following such ascent, the holders will be completely accessible to the operator when stationed in front of the machine for inserting the products into the holders.

When a product such as a bell pepper, indicated by the reference numeral 50, is to be operated on in the machine, it is inserted in the holder with the stem end uppermost as illustrated in Figure 5, and while the lower fingers normally serve as a stop for the product. The bottom wall portions 26 of the segments will in any event prevent the product from being forced out through the bottom of the holder. Engagement of the guides with the segments to effect closure of the holders and retention of the product therein is set to take place, as shown in Figure 4, after the holders containing the product have initiated their movement on the upper reach of the conveyor. Removal of the core from the product is arranged to take place while the product is being carried in the holders as the latter move along on the upper reach of the conveyor. The coring means as clearly illustrated in Figures 3 and 4 comprises a plurality of knives 49 designed to be inserted in the product to excise the core and then withdraw the core as the knife is retracted. The knives are supported on a yoke 51 for vertical movement into and out of the holders. The yoke extends transversely over and above the conveyor and the number and positioning of the knives on the yoke correspond with the number and position of the holders on each of the bars 19. In this manner when a bar is directly under the knives, the latter will be in registration with the holders. As previously stated the conveyor is adapted for intermittent movement, and the timing of the wheels 44 and 46 of the Geneva drive for the conveyor is such that movement of the conveyor will be periodically halted as the holders on each crossrod are placed in registration with the knives.

Means are provided for causing the knives to move into and out of operative engagement with the holders while the latter are in registration with the knives. Support of the yoke 51 for vertical movement is provided by guide posts 52 fixed to the frame and slidably engaged by bearings 53 in the ends of the yoke. Movement of the yoke is effected by a pitman rod 54 connected to the yoke at one end and at the other end to the wheel 44. A full reciprocation of the yoke will thus be effected for each revolution of the wheel 44 and consequently each time a set of holders is positioned under the knives.

As will be noted, while reciprocative movement of the knives takes place throughout each revolution of the wheel 44, the length of time in which the knives are operatively engaged with the holder is only a portion of such revolution, and accordingly the pitman rod is connected to the wheel 44 at such a position as will cause the engagement of the knives with the holders to take place in the interval the conveyor is stationary.

Figure 2:
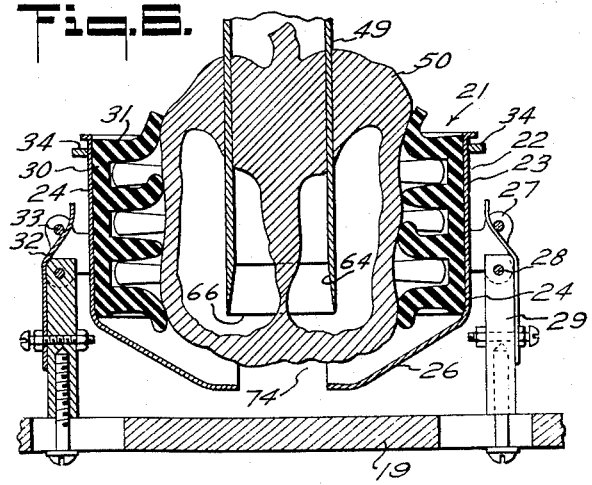
Figure 2 is a view corresponding to Figure 1, but shown on a somewhat larger scale and with parts in section.

In order to provide for effective cutting action by the knives, means are provided for imparting rotation thereto. As will be clear from Figures 2 and 3 each of the knives 49 are affixed at their upper ends to shafts 56 which are mounted in bearings 57 affixed to the yoke 51. Rotation of the shafts is effected by means of a pair of belts 58 engaging pulleys 59 on the shafts 56 and a pulley 61 mounted on a drive shaft 62 of an electric motor 63. The motor is supported directly on the yoke for movement therewith.

The knives 49 are in the form of hollow cylinders, and the portion 64 on the inside of the knife cylinder is tapered to the edge 66. When the product is supported by the segments for the coring operation, the core is disposed centrally and vertically in the holder, and when movement of the conveyor is halted for such operation, the core will be in axial alignment with the knife thereover. In this manner on descension of the yoke the rotating knife will enter the product and make a cylindrical cut around the core, thus freeing the core from the surrounding side and top portions of the product. It has been found that most effective cutting is provided by rotating the knives at a speed of approximately between 850 and 950 revolutions per minute. Speeds higher than this will tend to force the product out of the holder and speeds below this range will cause the knives to tear the product. It is important to note that the diameter of the cutting edge of the knife is appreciably less than that of the cylindrical center space defined between the free ends of fingers 31, thus obviating any danger of damaging the fingers during the cutting operation.

For certain products such as bell peppers, it is preferred that the core be excised without removing the portion of the product at the bottom or base thereof. In such case, the knives will be adjusted at the threaded portion 67 to a position on the yoke as will provide for termination of penetration of the knives before the bottom portion of the product is contacted. This may leave the core still attached to the base portion of the product. However, due to the flaring edge portion 64 the severed portion of the core within the knife will be wedged therein, and since the rotation of the knife is continuous the portion of the core remaining attached to the body or base of the product, which is usually quite thin, will be quickly twisted off and detached from the bottom of the product.

As will be evident, when the entire core has thus been detached from the product the yoke will be elevated whereby the knife will be withdrawn from operative engagement with the holder and the core will be simultaneously removed from within the product. Means are provided for thereupon ejecting the core from within the knife and such means comprises a fixed member 68 adjustably secured at its upper end to the cross member 69 of the frame and extending through the upper end of the knife into the interior thereof. The end of the fixed member 68 is provided with a core engaging head 71 and the latter is so positioned that when the knife is elevated the head 71 will engage the core therein and effect the ejection thereof from the knife by the time the knife has reached its top position. The knife moves through a hopper 72 suitably fixed to the frame and is positioned to receive the core as it is ejected from the knife, the rotating action of the knife serving to direct the ejected core to the sides of the hopper from whence the core is discharged into a chute 73 for disposal as desired.

When the knives become disengaged from the product, the pin 47 of the wheel 44 enters into engagement with the wheel 46 whereby the conveyor is again moved forwardly and the holders with the product therein are advanced until the succeeding row of holders have reached the position of registration with the knives, so that the core removing operation as above described may be repeated.

Means are provided for cutting or slicing the cored product into half sections, this being done in order to facilitate subsequent washing and inspection of the product. The slicing is effected during the time the conveyor is in motion. It will be noted that this is in contrast to the coring operation which is performed during the interval that the conveyor is stationary. As shown in the drawings the pair of segments of each holder are aligned with each other transversely of the direction of movement of the conveyor, and as will be clear from Fig. 6, when the holder is in closed position the confronting portions thereof including the backing and bottom walls are separated so as to define a space 74 between the segments. Thus when the product is contained in the holder a part of the former will, of course, be disposed in the space 74. Mounted on a shaft 76 which is supported for rotation between the brackets 39 of the frame, is a plurality of cutting or slicing discs 77. The shaft extends parallel to the bars 19 on which the holders are mounted and is maintained in continuous rotation by means of a sprocket chain 78 operatively engaged with sprockets 79 and 81 mounted on the shafts 43 and 76 respectively. The discs are disposed on the shaft 76 in the same spaced relationship as the holders on the bars 19 and in such manner as to lie in the direct path of the portions of the products in the space 74 of the holders as the holders are advanced with the conveyors. The discs are so positioned and of such size that enough of the disc will engage within the space 74 to completely sever the product as it moves by the discs. In the present embodiment the discs are arranged to enter the spaces 74 and completely effect the severing of the product as the holders move forwardly and downwardly with the conveyor over the sprocket wheels 13. It will, of course, be understood that the guides 34 are extended for sufficient length to remain in engagement with the segments and hold them in closed position until the slicing as well as the coring operation has been completed.

Desirably the guides 34 are caused to become disengaged from the segments as the latter continues downward with the conveyor. In this manner the segments under the action of the spring 32 will be moved to expanded position whereupon the cored and sliced product sections will be released and discharged from the holder to drop into a receptacle 82 or other suitable receiving means. At the same time the empty holders are returned by the conveyor for receiving new product at the front end of the machine.

What is claimed is:

1. In a machine for coring products such as bell peppers, a frame, a conveyor mounted on said frame with its upper reach arranged to move longitudinally from the front to the rear of the machine, a plurality of product supporting means positioned in predetermined transversely spaced relation and each including a pair of arcuate segments mounted on said conveyor for movement therewith and individual transverse movement to and from each other with their concave sides in confronting relation, the segments of each supporting means when moved together providing an open ended enclosure for receiving and holding said product therein, the segments of each supporting means when moved apart having their lower edge portions adjacent each other in product retention position and their upper edge portions spaced at a greater distance from each other for receiving said product, resilient means on the concave sides of the segments for yieldingly engaging the sides of the product at a plurality of spaced points on the periphery thereof, means carried by each product supporting means for yieldingly retaining the segments thereof in open product receiving position, a plurality of rotatable reciprocating coring knives supported on the frame over and above the conveyor and positioned in the same transverse relationship as the supporting means on the conveyor, said knives operative on reciprocation thereof to excise and withdraw the core from the product, means operative to move the knives into and out of operative engagement with the product in the supporting means, means cooperative with the knives for ejecting the core withdrawn from the product, and a plurality of pairs of transversely spaced guides supported upon the frame over said conveyor in the same transverse relationship as the supporting means on the conveyor, each pair of guides being transversely spaced to engage the outer sides of the segments of the respective supporting means and urge the segments into closed product retention position as the supporting means are moved along the conveyor between the pairs of guides, said pairs of guides extending longitudinally from a position forward of said coring knives to a position rearward thereof at the rear end of the machine whereby the segments of each supporting means are released to open position as they leave the upper reach of the conveyor.

2. In a machine of the character described, a supporting means for a product such as a bell pepper comprising a longitudinally movable conveyor, a pair of product holding segments each having arcuate side walls and a sloping bottom wall with the edges of the side and bottom walls being in the same plane, said segments disposed in vertically spaced relation to said conveyor and with their wall edges in transversely spaced confronting relation, pivot support means carried by said conveyor and pivotally mounting said segments for rotation about longitudinal pivotal axes disposed outwardly adjacent the respective segments and intermediate the rims and bottom walls thereof, and resilient means on the concave walls of the segments for yieldingly engaging the sides of the product at a plurality of spaced points on the periphery thereof.

3. In a machine as set forth in claim 2, characterized by said resilient means comprising a plurality of flexible fingers extending radially inwardly from each of said segments, fingers tapering to their free ends and combining to define at such free ends a passage extending axially through the segments and longitudinally of said conveyor.

References Cited in the file of this patent

UNITED STATES PATENTS

| | | |
|---|---|---|
| 596,343 | Topp | Dec. 28, 1897 |
| 1,415,458 | Lewis | May 9, 1922 |
| 1,480,819 | Forrester et al. | Jan. 15, 1924 |
| 2,040,114 | Watkins | May 12, 1936 |
| 2,299,137 | Geren et al. | Oct. 20, 1942 |
| 2,524,844 | Smith | Oct. 10, 1950 |
| 2,597,279 | Bailey | May 20, 1952 |
| 2,742,067 | Coons et al. | Apr. 17, 1956 |